Feb. 21, 1933. C. A. HAWKINS 1,898,444
SEAT
Filed March 30, 1931
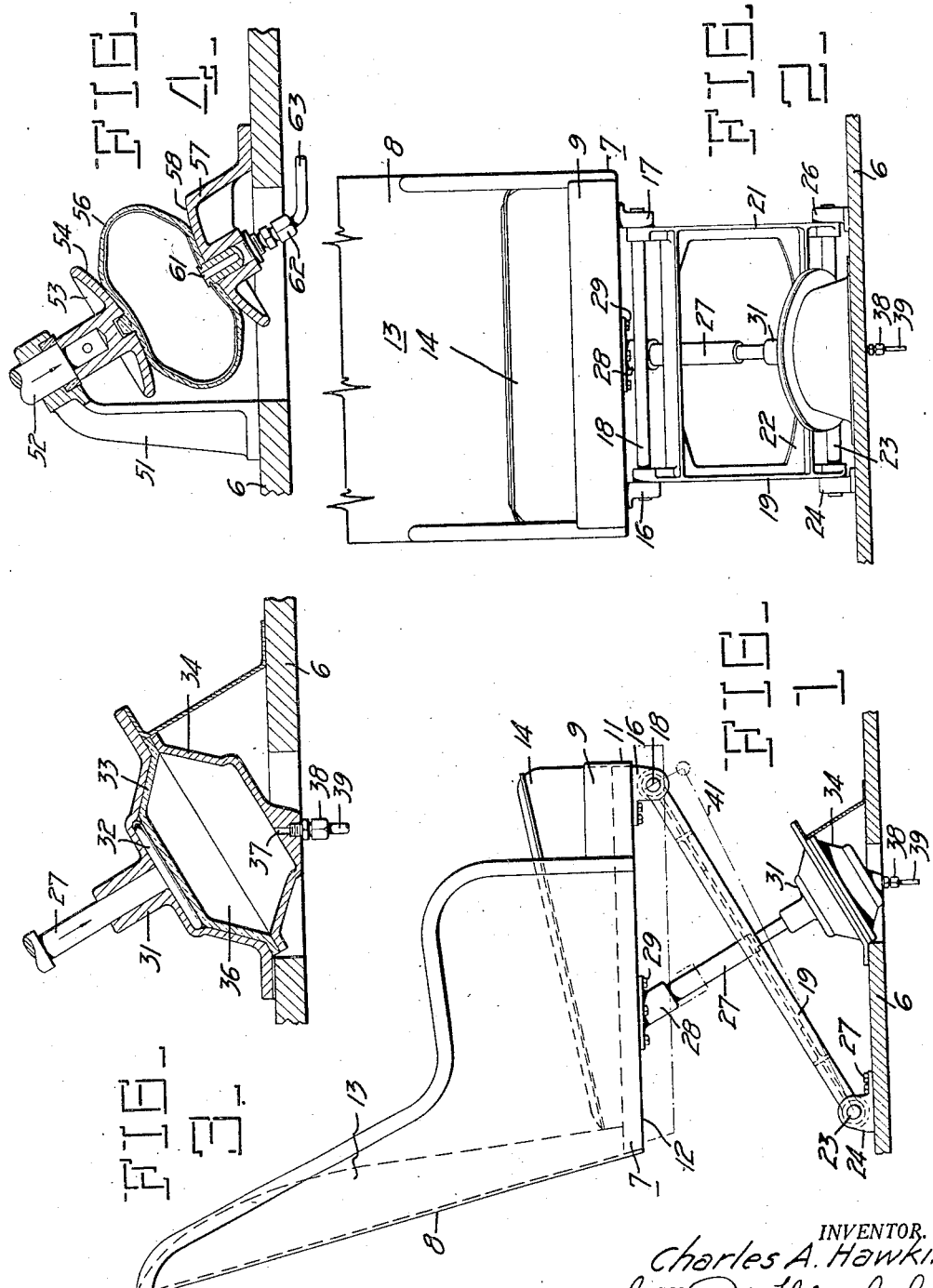
INVENTOR.
Charles A. Hawkins
BY White, Prost, Hehr & Lothrop
ATTORNEYS.

Patented Feb. 21, 1933

1,898,444

UNITED STATES PATENT OFFICE

CHARLES A. HAWKINS, OF SAN FRANCISCO, CALIFORNIA

SEAT

Application filed March 30, 1931. Serial No. 526,156.

My invention relates particularly to passenger seats primarily for use in motor vehicles such as busses and the like although it is capable of use in any environment wherein a comfortable and accommodating seat is desired. Particularly in the case of motor busses which often travel rapidly over relatively rough roads it is too much to expect that the vehicle tires and springing will take care of numerous irregularities in the road surface which ordinarily and heretofore have been transferred directly to the passengers. Difficulties arise in designing a seat for passengers under such conditions inasmuch as the weight of the various successive occupants of the seat varies with the individual so that a seat that is correctly mounted and is adapted to support a child, for instance, is quite unadapted to support the weight of a large man. In addition, very often the supporting structure for a suitable seat is unduly cumbersome and requires a relatively large amount of space. Particularly in busses space is at a premium and any saving thereof is highly advantageous.

It is therefore an object of my invention to provide a seat which is comfortable for any of various occupants.

Another object of my invention is to provide a seat which will supplement the shock absorbing qualities of an ordinary vehicle suspension.

A further object of my invention is to provide a seat in which the resiliency can be varied.

An additional object of my invention is to provide a seat the supporting structure of which occupies a minimum of room.

The foregoing and other objects are attained in the embodiment of the invention shown in the drawing, in which Figure 1 is a side elevation, portions being in section, of a seat constructed in accordance with my invention.

Figure 2 is a front elevation, portions being broken away to reduce the size of the figure and other portions being shown in section, of a seat constructed in accordance with my invention.

Figure 3 is a cross section on a median plane of one type of pneumatic cushion for the seat of my invention.

Figure 4 is a cross section on a median plane of a modified type of pneumatic cushion useful in conjunction with the seat of my invention.

In its preferred form, the seat of my invention comprises a chair frame which is spaced from a support and is pivotally connected thereto by a pair of links lying in a plane substantially perpendicular to the axis of an inclined plunger fixed to the chair frame and resting against a pneumatic cushion interposed between the end of the plunger and the support.

In the form of my invention shown in the drawing, there is preferably provided a support 6 which customarily is of planar form and may be the floor of a vehicle. Spaced from the support 6 is a chair frame 7 of any suitable contour usually comprising a back 8 and a seat 9 which may be considered as having a forward portion 11 and a rearward portion 12. Usually the chair frame 7 supports a back cushion 13 and a seat cushion 14 which may be removable if desired.

In order to constrain the chair frame 7 to approximately rectilinear movement I preferably provide in the forward portion 11 thereof a pair of brackets 16 and 17 each of which is fastened to the chair frame and is pierced by an aperture to receive a shaft 18. Pivotally mounted with respect to the chair frame 7 on the shaft 18 respectively adjacent an end of each link is a pair of links 19 and 21, in this instance disclosed as forming part of a framework 22. If desired, the links 19 and 21 can be separate but in any case they are preferably parallel and lie in the same transverse plane.

At its opposite end, each of the links is preferably pierced to receive a shaft 23 substantially parallel to the shaft 18 and situated below or under the rearward portion 12 of the chair frame 7. For relating the shaft 23 to the support 6 a pair of journal blocks 24 and 26 is provided. Each of the journal blocks is preferably secured to the floor or support 6 by suitable fastening means such as bolts 27. The length of the links 19 and 21 and the relationship of the pivotal axes is such that the chair frame 7 partakes of substantially a rectilinear translatory movement with respect to the support 6, that is, the chair frame although spaced from the support 6 moves toward and away therefrom in accordance with the pivotal movement of the links 19 and 21, but the arc of movement is so slight as to be practically negligible.

In order to afford means for assuming any load placed on the chair frame 7, I preferably provide a plunger 27 which lies substantially perpendicular to the plane of the links 19 and 21 and is affixed to the chair frame by means of a socket 28 suitably fastened in place as by bolts 29.

The plunger 27 near its lower end preferably passes through a guide 31 suitably fastened to the support 6. In the present instance the guide 31 is inclined to the support and fits the plunger 27 somewhat loosely so that the slight arcuate movement of the brackets 16 and 17 is accommodated. At its lower end the plunger 27 terminates in a head 32 situated within the guide 31 and abutting or contacting a diaphragm 33 preferably of flexible material which is clamped in place against the guide 31 by a support 34 so that a closed chamber 36 is provided.

In order to establish communication with the interior of chamber 36 and a source of fluid such as air under pressure, I preferably provide the support 34 with an aperture 37 into which a fitting 38 is screwed so that a conduit 39 leading to a source of air can be connected thereto. It is contemplated that a valve or other controller will be installed in the conduit 39 so that communication with the chamber 36 can be controlled or regulated.

In the operation of this device the chamber 36 contains fluid such as air under a predetermined pressure designed to accommodate the weight of a person occupying the chair frame 7. When the chair is unoccupied the plunger 27 occupies substantially the position shown in Figure 3 due to the pressure of air within the chamber 36. When the chair is occupied the plunger 27 is depressed due to the load on the chair frame 7 transmitted through the plunger 27 and until the pressure within the chamber 36 balances the load on the chair frame 7. During such accommodating movement the links 19 and 21 move about the pivotal axles 23 and 18 substantially as indicated by the dotted lines 41 in Figure 1. As the vehicle encounters irregularities in the road surface which are ordinarily transmitted to the passengers therein, the resilient character of the air cushion provided by the chamber 36 is such as to absorb such shocks and prevent them from being transmitted to the passengers.

In the event that successive passengers vary greatly in weight the air pressure within the chamber 36 can readily be altered by permitting flow into or out of the chamber 36 through the conduit 39 so that a proper cushion can always be provided.

In Figure 4 there is shown a modification of the air chamber disclosed in Figure 3. In this instance, the support 6 is provided with a bracket 51 within which the plunger 52 reciprocates. The end of the plunger is provided with a mushroom head 53 having a curved abutting surface 54 to coact with a resilient container 56 which is secured against an abutment 57 mounted on the support 6. The abutment 57 likewise has a curved abutting surface 58 which in conjunction with the surface 54 acts upon the container 56 in such a fashion that as the load on the plunger 52 increases an increasing superficial area of the container 56 is utilized to carry the load. With this mechanism it is not necessary under all conditions to increase the pressure of air within the container 56 inasmuch as a greater superficial area is brought into play. In this modification of the device, communication with the interior of the container 56 is obtained through a tube 61 coupled by a fitting 62 to a conduit 63 extending through a valve or other suitable mechanisms to a source of fluid such as air under pressure.

In both of the forms of the seat of my invention there is provided a very resilient support for a person occupying the chair frame, which support is adjustable to accommodate the weight of persons of different size. Furthermore the mechanism occupies a slight amount of room and is not only cheap to construct but may be very easily mounted and dismounted.

It is to be understood that I do not limit myself to the form of the seat shown and described herein, as the invention, as set forth in the following claims may be embodied in a plurality of forms.

I claim:

1. A seat comprising a support, a chair frame spaced from said support, a central plunger rigidly fixed to said chair frame and extending forwardly therefrom at an inclination to said support, a guide for said plunger on said support, a pneumatic cushion for said plunger disposed between said guide and said support, and a single pair of links connecting said frame and said support, each of said links at one end being pivoted to a forward portion of said frame and at the other end being pivoted to a rearward portion of said support.

2. A seat comprising a support, a chair frame spaced from said support, a central plunger rigidly fixed to said chair frame, a pneumatic cushion interposed between said plunger and said support for assuming substantially all load on said chair frame, and a single pair of positioning links pivoted to the sides of said chair frame and to said support.

3. A seat comprising a support, a chair frame spaced from said support, a central plunger rigidly fixed to said chair frame, a pneumatic cushion interposed between said plunger and said support, a rectangular frame encompassing said plunger, means for connecting said frame to pivot adjacent the forward edge of said chair frame, and means for connecting said frame to pivot on said support beneath the rearward edge of said chair frame.

In testimony whereof, I have hereunto set my hand.

CHARLES A. HAWKINS.